United States Patent
Nakayama

(10) Patent No.: US 6,978,086 B2
(45) Date of Patent: Dec. 20, 2005

(54) IMAGING APPARATUS

(75) Inventor: Yoshikatsu Nakayama, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 1203 days.

(21) Appl. No.: 09/839,904

(22) Filed: Apr. 20, 2001

(65) Prior Publication Data

US 2002/0008764 A1 Jan. 24, 2002

(30) Foreign Application Priority Data

Apr. 28, 2000 (JP) .............. 2000-131325

(51) Int. Cl.$^7$ .................. H04N 5/225; H04N 7/06
(52) U.S. Cl. .................. 386/117; 386/107
(58) Field of Search .................. 386/46, 107, 117, 386/120, 27, 33, 38, 52, 53, 4, 1; H04N 5/225, H04N 7/06

(56) References Cited

U.S. PATENT DOCUMENTS

| 5,130,860 A | * | 7/1992 | Nagashima et al. ........ 386/101 |
| 6,359,649 B1 | * | 3/2002 | Suzuki .................... 348/220.1 |
| 6,577,805 B1 | * | 6/2003 | Hirai ........................... 386/46 |
| 2005/0151857 A1 | * | 7/2005 | Noguchi et al. ......... 348/231.7 |

* cited by examiner

Primary Examiner—Robert Chevalier
(74) Attorney, Agent, or Firm—Cowan, Liebowitz & Latman, P.C.

(57) ABSTRACT

An imaging apparatus, such as a video camera, is arranged to record a first image signal and a second image signal on a first recording medium and a second recording medium, respectively. While recording on the first recording medium the first image signal subjected to a process corresponding to a first special effect, the imaging apparatus records on the second recording medium the second image signal subjected to a process corresponding to a second special effect different from the first special effect.

13 Claims, 2 Drawing Sheets

IMAGING APPARATUS

BACKGROUND OF THE INVENTION

1. Field of the Invention

The present invention relates to a recording apparatus, and more particularly to an apparatus for recording image signals on a plurality of recording media.

2. Description of Related Art

In recent years, there has been proposed a video camera recorder (hereinafter referred to as "camcorder") capable of not only recording a moving image signal on a magnetic tape but also recording a still image in a memory card at arbitrary timing. In such a camcorder, there is an advantage that, for example, even during the process of recording a moving image, it is possible to, without stopping recording the moving image, simultaneously record a still image in a recording medium which is different from a recording medium on which the moving image is being recorded.

However, in the above-mentioned camcorder capable of simultaneously recording images on two recording media, it is impossible to, for example, during the process of recording on a tape a moving image signal subjected to a special effect, such as fade or monochrome, record in a memory card an ordinary image not subjected to such a special effect, or it is impossible to simultaneously record, on a tape and in a card, image signals subjected to respective different special effects.

BRIEF SUMMARY OF THE INVENTION

It is an object of the invention to solve the above-stated problems.

It is another object of the invention to provide such an arrangement that, even when an image signal subjected to an arbitrary special effect process is being recorded on one recording medium, an ordinary image not subjected to any special effect process can be simultaneously recorded on another recording medium.

It is a further object of the invention to provide such an arrangement that two image signals subjected to respective different special effect processes can be simultaneously recorded on two recording media.

To attain the above objects, in accordance with an aspect of the invention, there is provided an imaging apparatus, comprising imaging means, signal processing means for subjecting an image signal obtained by the imaging means to a signal process corresponding to a designated special effect to form a first image signal and a second image signal, first recording means for recording the first image signal on a first recording medium, second recording means for recording the second image signal on a second recording medium different from the first recording medium, and control means for controlling the signal processing means, the first recording means and the second recording means in such a way as to, while recording, on the first recording medium, the first image signal subjected to a process corresponding to a first special effect, record, on the second recording medium, the second image signal subjected to a process corresponding to a second special effect different from the first special effect.

The above and other objects and features of the invention will become apparent from the following detailed description of a preferred embodiment thereof taken in conjunction with the accompanying drawings.

DETAILED DESCRIPTION OF THE INVENTION

Hereinafter, a preferred embodiment of the invention will be described in detail with reference to the drawings.

Figure 1:
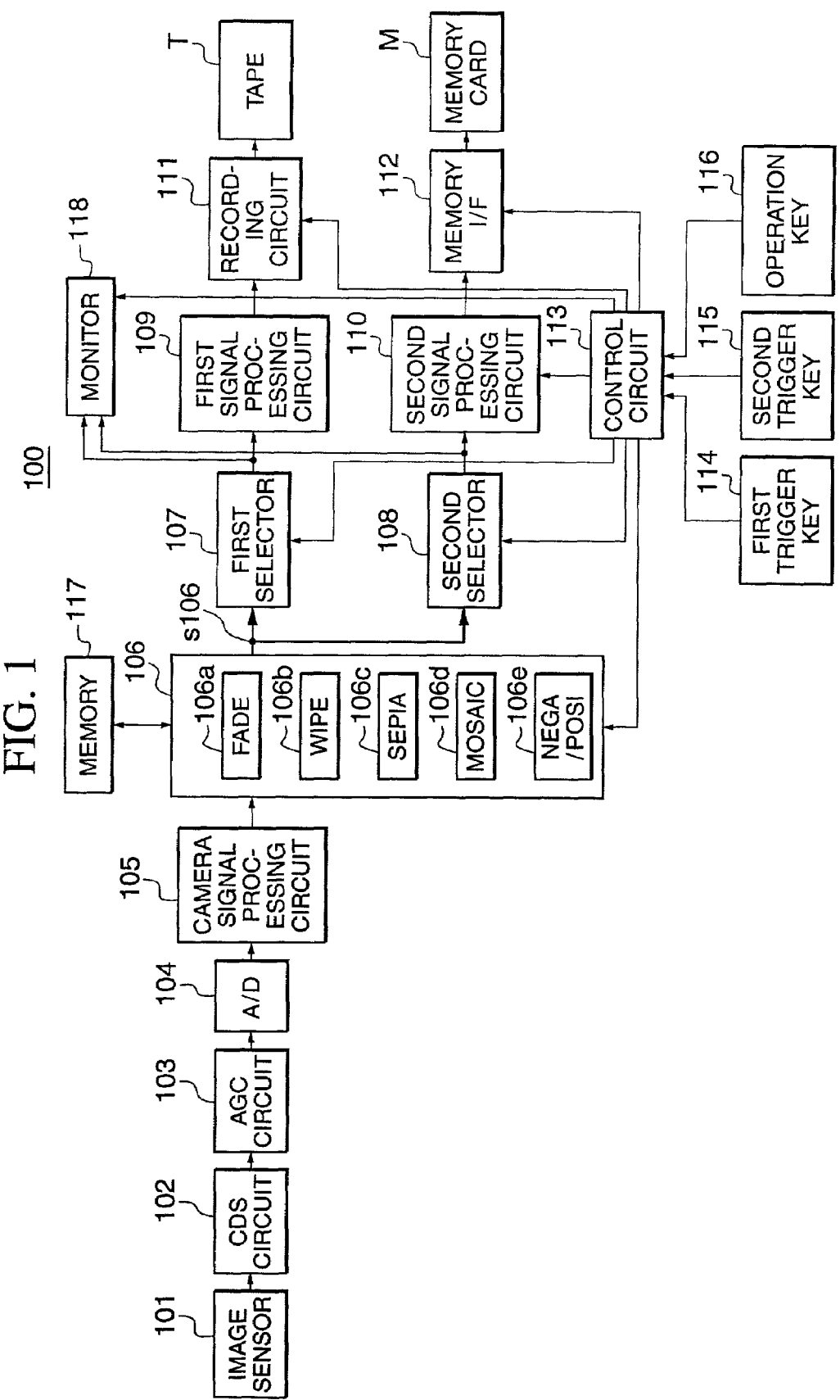
FIG. 1 is a block diagram showing the arrangement of a camcorder (video camera recorder) according to an embodiment of the invention.

FIG. 1 is a block diagram showing the arrangement of a camcorder 100 according to the embodiment of the invention.

In FIG. 1, reference numeral 101 denotes an image sensor, such as a CCD, and reference numeral 102 denotes a CDS (correlated double sampling) circuit, which is arranged to remove a clock component from a signal outputted from the image sensor 101 so as to form a continuous imaging signal. Reference numeral 103 denotes an AGC (automatic gain control) circuit, which is arranged to automatically control the gain of an input signal. Reference numeral 104 denotes an A/D converter, which is arranged to A/D-convert a signal outputted from the AGC circuit 103. Reference numeral 105 denotes a camera signal processing circuit, which is arranged to process, as an image, a signal outputted from the A/D converter 104.

Reference numeral 106 denotes a special effect processing circuit, which includes a fade processing part 106a, a wipe processing part 106b, a sepia processing part 106c, a mosaic processing part 106d, a negative/positive inverting processing part 106e, etc. Each of the processing parts 106a to 106e is arranged to subject an image signal outputted from the camera signal processing circuit 105 to a special effect process, such as wipe, fade, sepia process, mosaic process, negative/positive inverting process, etc.

Reference numeral 107 denotes a first selector, and reference numeral 108 denotes a second selector. The first selector 107 and the second selector 108 are arranged to arbitrarily change over signals s106 outputted from the special effect processing circuit 106 and to then supply the signals s106 respectively to a first signal processing circuit 109 and a second signal processing circuit 110. The first signal processing circuit 109 is arranged to subject a signal selected by the first selector 107 to a compression process, an encoding process, etc., using a known block coding method, etc., to convert the signal into the form conforming to a recording format for a tape T, and to then output the signal, as a first image signal, to a recording circuit 111.

Further, the second signal processing circuit 110 is also arranged to subject a signal selected by the second selector 108 to a compression process, an encoding process, etc., to convert the signal into the form conforming to a recording format for a memory card M, and to then output the signal to a memory I/F 112.

The recording circuit 111 is arranged to record, on the magnetic tape T, the first image signal outputted from the first signal processing circuit 109, by forming a number of tracks on the tape T with a rotary head. The memory I/F 112 is arranged to record, in the memory card M, the second image signal outputted from the second signal processing circuit 110. The magnetic tape T is contained in a cassette (not shown), which is loaded in the camcorder 100 by a cassette loading mechanism associated with the recording circuit 111. The memory card M is loaded in the camcorder 100 via a card slot (not shown).

Reference numeral 113 denotes a control circuit, which controls the operation of each part. Reference numeral 114 denotes a first trigger key, and reference numeral 115 denotes a second trigger key. The first trigger key 114 is arranged to generate a trigger signal for giving instructions for the execution or stop of the recording action of the first image signal on the tape T according to the operation of the user. The second trigger key 115 is arranged to generate a trigger signal for the recording action of the second image signal in the memory card M according to the operation of the user.

Reference numeral 116 denotes an operation key, which includes selection switches for allowing the user to select whether to subject the first or second image signal to a special effect process or for allowing the user to select the kind of a special effect process to which the first or second image signal is to be subjected, a power supply switch, etc. Reference numeral 117 denotes a memory. The special effect processing circuit 106 performs a variety of special effect processes by using the memory 117. Reference numeral 118 denotes a monitor. The monitor 118 makes it possible for the user to confirm the manner of an image signal selected by the first selector 107 or the second selector 108. In addition, on the monitor 118, a menu picture for use in deciding the kind of a special effect process with the operation key 116 is displayed.

Referring to FIG. 1, a signal read out from the image sensor 101 is converted by the CDS circuit 102 into a continuous signal with clock signal components thereof removed. The gain of the signal outputted from the CDS circuit 102 is controlled by the AGC circuit 103. The output of the AGC circuit 103 is converted into a digital signal by the A/D converter 104. After that, the signal is subjected to a known process by the camera signal processing circuit 105, and is then outputted to the special effect processing circuit 106.

The special effect processing circuit 106 includes processing blocks 106a to 106e for performing the respective different special effect processes. These processing blocks 106a to 106e make it possible to perform a plurality of kinds of special effect processes, simultaneously in parallel, on the output signal of the camera signal processing circuit 105. In addition, such a plurality of kinds of special effect processes may be performed in combination.

The processing blocks 106a to 106e perform the respective special effect processes by using the memory 117. Then, from the special effect processing circuit 106, signals s106 including the output signals of the processing blocks 106a to 106e and a signal not subjected to any special effect process are outputted to the first selector 107 and the second selector 108.

Each of the first selector 107 and the second selector 108 selects one of the signals s106 subjected to the respective special effect processes, independently, according to the control signals from the control circuit 113. Then, the first selector 107 outputs the selected signal to the first signal processing circuit 109 and the monitor 118, and the second selector 108 outputs the selected signal to the second signal processing circuit 110 and the monitor 118.

The control circuit 113 causes the output signal of the block for the special effect process corresponding to a special effect selected by the user, among the processing blocks 106a to 106e, according to the result of setting by the operation key 116, to be selected from the signals s106.

More specifically, the user is allowed to independently set a special effect to be performed on an image signal to be recorded on the tape T and a special effect to be performed on an image signal to be recorded in the memory card M, by operating the operation key 116.

The first signal processing circuit 109 subjects the image signal outputted from the first selector 107 to an encoding process using a known block coding method, thereby compressing the amount of information thereof, and outputs the processed signal to the recording circuit 111. In the present embodiment, a moving image signal outputted from the first selector 107 is compressed and coded, and the coded moving image signal is recorded on the tape T by the recording circuit 111 with a number of tracks formed on the tape T with the rotary head.

Further, the second signal processing circuit 110 similarly encodes the image signal outputted from the second selector 108, thereby compressing the amount of information thereof, and outputs the processed signal to the memory I/F 112. In addition, the second signal processing circuit 110 selects an image signal for one frame from among the moving image signal outputted from the second selector 108, according to the control signal from the control circuit 113, compresses and encodes the image signal for one frame into a still image signal, and outputs the still image signal to the memory I/F 112. The memory I/F 112 records the still image signal for one frame in the memory card M. The second signal processing circuit 110 performs an encoding process conforming to a coding method for a still image signal, for example, the JPEG method, which is different from that of the first signal processing circuit 109.

Incidentally, in the present embodiment, with regard to special effect processes to be performed on a still image signal to be recorded in the memory card M, fade and wipe processes among the above-mentioned plurality of special effect processes are made unable to be selected. This is because the fade and wipe processes are effects effective only for a moving image signal and are ineffective for a still image signal.

Accordingly, when a special effect for a still image to be recorded in the memory card M is selected by the operation key 116, the control circuit 113 provides such a control operation that a special effect to be performed on a still image signal to be recorded in the memory card M is selected from among the special effect processes other than the fade and wipe processes.

The control circuit 113 controls the first selector 107 and the recording circuit 111 according to the operation of the first trigger key 114 so as to cause a moving image signal processed according to the special effect selected by the user to be recorded on the tape T. Further, the control circuit 113 controls the second selector 108, the second signal processing circuit 110 and the memory I/F 112 according to the operation of the second trigger key 115 so as to cause a still image signal processed according to the special effect selected by the user to be recorded in the memory card M. Then, in the present embodiment, the recording action of a moving image signal according to the first trigger key 114 and the recording action of a still image signal according to the second trigger key 115 can be effected at the respective independent arbitrary timing points.

In this instance, even during the process of recording an image signal on the tape T by the recording circuit 111, it is possible to record an image signal in the memory card M by the memory I/F 112. Accordingly, according to the present embodiment, for example, even during the process of recording a moving image signal subjected to the negative/ positive inverting process on the tape T, it is possible to record a still image signal subjected to the mosaic process in the memory card M.

Incidentally, while, in the present embodiment, image signals are made to be recorded respectively on the magnetic tape T and in the memory card M, another recording medium, such as a magneto-optical disk, may be used in place of the magnetic tape.

In addition, instead of providing two keys, i.e., the first trigger key 114 and the second trigger key 115, a single trigger key may be used for generating two kinds of trigger signals.

Further, the user is allowed to select, by using the operation key 116, the kind of a special effect or the execution/nonexecution of a special effect to be performed on each of the first image signal to be recorded on the tape T and the second image signal to be recorded in the memory card M. In this instance, the content selected by the operation key 116 is displayed on the monitor 119, on the basis of which the user can confirm the content as selected.

Figure 2:
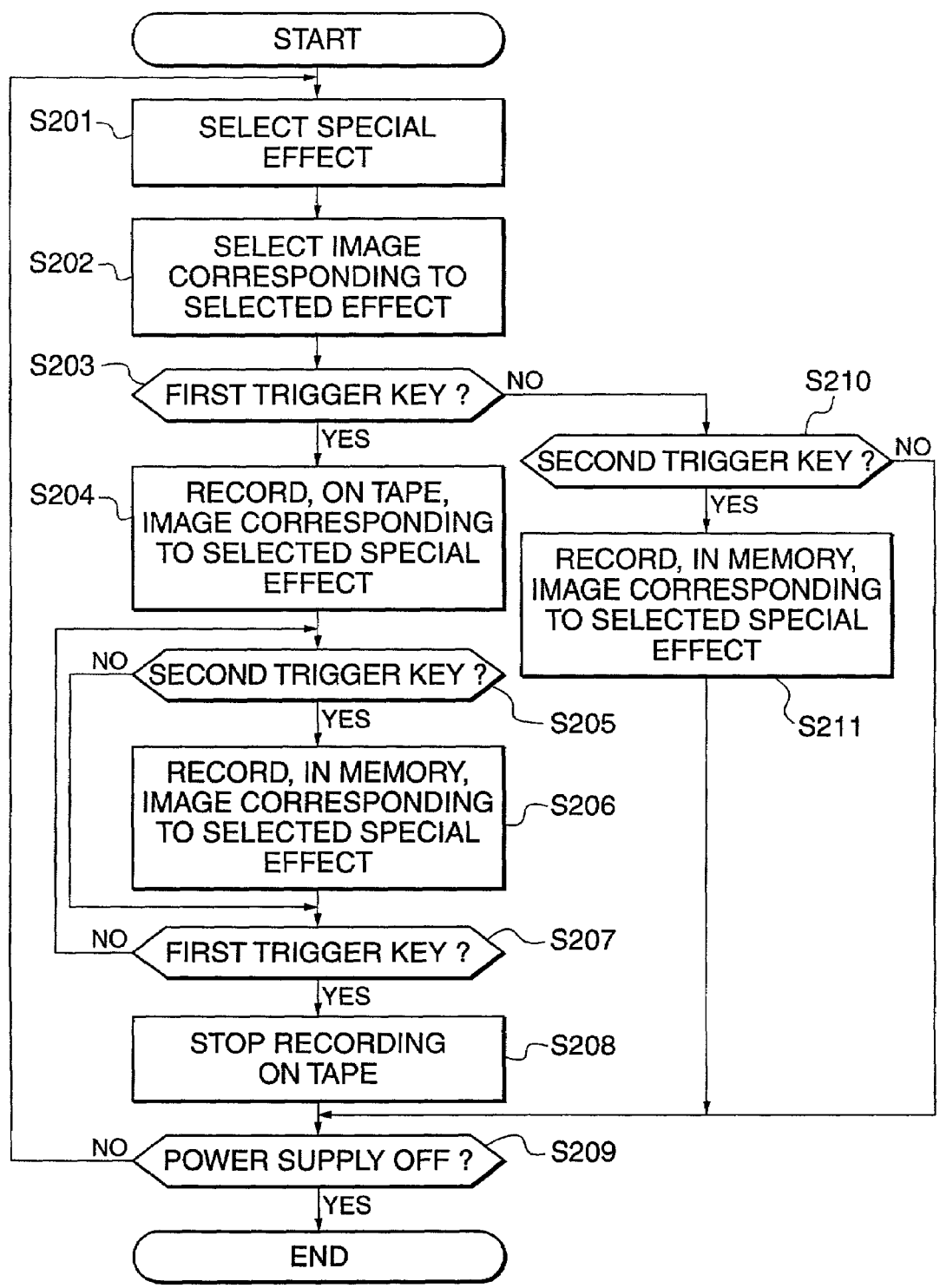
FIG. 2 is a flow chart for explaining the action of the camcorder shown in FIG. 1.

Next, the action of the camcorder 100 having the above-described construction will be described with reference to the flow chart of FIG. 2. FIG. 2 is a flow chart for explaining the control operation of the control circuit 113 to be executed during the recording operation in the present embodiment.

Referring to FIG. 2, when the power supply is turned on, first, at step S201, the user operates the operation key 116 to select the execution or nonexecution of a special effect or the kind of a special effect to be performed on each of the first image signal, i.e., an image signal to be recorded on the tape T, and the second image signal, i.e., an image signal to be recorded in the memory card M. Next, at step S202, the control circuit 113 controls the first selector 107 and the second selector 108 to select output signals s106 corresponding to the special effects set at the step S201.

Next, at step S203, the control circuit 113 makes a check to find if an instruction for starting recording is received from the first trigger key 114. If so, the procedure proceeds to step S204. At the step S204, the control circuit 113 controls the recording circuit 111 to cause the first image signal processed by the first signal processing circuit 109 via the first selector 107 to be recorded on the tape T. The image signal which is to be recorded in this instance is subjected to a special effect process set by the user.

Then, during the recording action, at step S205, the control circuit 113 makes a check to find if an instruction for starting recording is received from the second trigger key 115. If so, the procedure proceeds to step S206. At the step S206, the control circuit 113 controls the second signal processing circuit 110 to extract one frame of the image signal outputted from the second selector 108 and to subject the one-frame image signal to the encoding process as mentioned above, and causes the thus-processed image signal to be outputted to the memory I/F 112. Then, the control circuit 113 controls the memory I/F 112 to cause the image signal encoded by the second signal processing circuit 110 to be recorded, as a still image, in the memory card M. The still image signal which is to be recorded in this instance is subjected to a special effect process set by the user.

Next, at step S207, the control circuit 113 makes a check to find if an instruction for ending recording is received from the first trigger key 114. The processes of the steps S205 and S206 are repeated until a trigger signal for ending recording is generated. If the trigger signal for ending recording is generated, the procedure proceeds to step S208. At the step S208, the control circuit 113 controls the recording circuit 111 to stop the recording action thereof. At step S209, the control circuit 113 makes a check for an instruction for turning off the power supply. If there is no instruction for turning off the power supply, the procedure returns to step S201.

On the other hand, if, at the step S203, there is no instruction from the first trigger key 114, the procedure proceeds to step S210. At the step S210, the control circuit 113 makes a check to find if an instruction for starting recording is received from the second trigger key 115. If so, the procedure proceeds to step S211. At the step S211, the control circuit 113 controls the second signal processing circuit 110 to extract one frame of the image signal outputted from the second selector 108 and to subject the one-frame image signal to the encoding process as mentioned above, and causes the thus-processed image signal to be outputted to the memory I/F 112. Then, the control circuit 113 controls the memory I/F 112 to cause the image signal encoded by the second signal processing circuit 110 to be recorded, as a still image, in the memory card M. The still image signal which is to be recorded in this instance is subjected to a special effect process set by the user. After the completion of the recording action on the memory card M, at the step S209, the control circuit 113 makes a check for an instruction for turning off the power supply.

Further, if, at the step S210, there is no instruction from the second trigger key 115, at the step S209, the control circuit 113 also makes a check for an instruction for turning off the power supply. If there is no instruction for turning off the power supply, the procedure returns to step S201.

As has been described above, according to the present embodiment, when image signals are simultaneously recorded respectively on the magnetic tape T and in the memory card M, special effects to be performed on the image signals to be recorded on the tape and in the memory card can be independently set. Therefore, image signals subjected to the respective different special effects can be simultaneously recorded on the tape and in the memory card.

Accordingly, even during the process of performing the imaging and recording action subjected to an arbitrary process, for example, a special effect process, an ordinary image, which is not influenced by the arbitrary process, can be simultaneously recorded at arbitrary timing, or two image signals can be subjected to respective different arbitrary processes, for example, special effects, and then can be simultaneously recorded at arbitrary timing.

What is claimed is:

1. An imaging apparatus, comprising:
   imaging means;
   signal processing means for subjecting an image signal obtained by said imaging means to a signal process corresponding to a designated special effect to form a first image signal and a second image signal;
   first recording means for recording the first image signal on a first recording medium;
   second recording means for recording the second image signal on a second recording medium different from the first recording medium; and
   control means for controlling said signal processing means, said first recording means and said second recording means in such a way as to, while recording, on the first recording medium, the first image signal subjected to a process corresponding to a first special effect, record, on the second recording medium, the second image signal subjected to a process corresponding to a second special effect different from the first special effect.

2. An imaging apparatus according to claim 1, further comprising designation means for independently designating a special effect to be performed on the first image signal and a special effect to be performed on the second image signal.

3. An imaging apparatus according to claim 2, wherein said designation means designates the special effect by selecting one from among a plurality of predetermined special effects.

4. An imaging apparatus according to claim 1, wherein said signal processing means forms the first image signal by using a moving image signal obtained by said imaging means, and forms the second image signal by extracting an image signal for one frame from the moving image signal and using the extracted image signal for one frame.

5. An imaging apparatus according to claim 1, wherein the first recording medium is a magnetic tape, and the second recording medium is a memory card.

6. An imaging apparatus according to claim 1, wherein the first recording medium is a magneto-optical disk, and the second recording medium is a memory card.

7. An imaging apparatus according to claim 1, wherein said signal processing means includes a plurality of processing blocks arranged to perform processes corresponding to a plurality of kinds of the special effects, said plurality of processing blocks being capable of operating simultaneously.

8. An imaging apparatus according to claim 7, wherein said signal processing means further includes a first selector arranged to select one from among a plurality of image signals outputted from said plurality of processing blocks and to output the selected image signal as the first image signal, and a second selector arranged to select one from among a plurality of image signals outputted from said plurality of processing blocks and to output the selected image signal as the second image signal.

9. An imaging apparatus according to claim 8, further comprising designation means for independently designating a special effect to be performed on the first image signal and a special effect to be performed on the second image signal, wherein said control means controls said first selector and said second selector in such a way as to select image signals outputted from processing blocks of said plurality of processing blocks corresponding to the special effects designated by said designation means.

10. An imaging apparatus according to claim 9, wherein said signal processing means further includes first encoding means for subjecting the image signal outputted from said first selector to a first encoding process, and second encoding means for subjecting the image signal outputted from said second selector to a second encoding process different from the first encoding process.

11. An imaging apparatus, comprising:
imaging means;
signal processing means for subjecting an image signal obtained by said imaging means to a signal process corresponding to a designated special effect to form a first image signal and a second image signal;
first recording means for recording the first image signal on a first recording medium;
second recording means for recording the second image signal on a second recording medium different from the first recording medium; and
control means for setting a recording mode between a first recording mode of causing said first recording means to record on the first recording medium the first image signal subjected by said signal processing means to a process corresponding to a first special effect, and a second recording mode of causing said second recording means to record on the second recording medium the second image signal subjected by said signal processing means to a process corresponding to a second special effect different from the first special effect.

12. An imaging apparatus, comprising:
imaging means;
signal processing means for subjecting an image signal obtained by said imaging means to a signal process corresponding to a designated special effect among a plurality of special effects to form a first image signal and a second image signal;
first recording means for recording the first image signal on a first recording medium;
second recording means for recording the second image signal on a second recording medium different from the first recording medium; and
control means for controlling said signal processing means, said first recording means and said second recording means in such a way as to, while recording, on the first recording medium, the first image signal subjected to a process corresponding to a first special effect, record, on the second recording medium, the second image signal not subjected to a process corresponding to any one of the plurality of special effects.

13. An imaging apparatus, comprising:
imaging means;
signal processing means for subjecting an image signal obtained by said imaging means to a signal process corresponding to a designated special effect among a plurality of special effects to form a first image signal and a second image signal;
first recording means for recording the first image signal on a first recording medium;
second recording means for recording the second image signal on a second recording medium different from the first recording medium; and
control means for setting a recording mode between a first recording mode of causing said first recording means to record on the first recording medium the first image signal subjected by said signal processing means to a process corresponding to a first special effect among the plurality of special effects, and a second recording mode of causing said second recording means to record on the second recording medium the second image signal not subjected by said signal processing means to a process corresponding to any one of the plurality of special effects.

* * * * *